United States Patent [19]

Kemp

[11] Patent Number: 4,624,938

[45] Date of Patent: Nov. 25, 1986

[54] PROCESS FOR PRODUCING WIDE-PORE CATALYST SUPPORTS

[75] Inventor: Richard A. Kemp, Stafford, Tex.

[73] Assignee: Shell Oil Company, Houston, Tex.

[21] Appl. No.: 727,975

[22] Filed: Apr. 26, 1985

[51] Int. Cl.[4] .......................... B01J 27/18; B01J 27/16; C01F 7/02

[52] U.S. Cl. ................................ 502/208; 208/216 R; 423/626; 423/628

[58] Field of Search ................. 502/208; 423/626, 628

[56] References Cited

U.S. PATENT DOCUMENTS

| | | | |
|---|---|---|---|
| 3,864,461 | 2/1975 | Miller et al. | 208/216 R |
| 3,879,310 | 4/1975 | Rigge et al. | 502/208 |
| 4,202,798 | 5/1980 | Johnson | 252/437 |

Primary Examiner—P. E. Konopka
Attorney, Agent, or Firm—Pamela J. McCollough

[57] ABSTRACT

This invention relates to a process for preparing catalyst supports with a wide pore size distribution by simultaneously titrating an acid aluminum species and a basic aluminum species, and interacting the precipitate with a phosphorus-containing oxide during the aging step. The porous resulting alumina supports have surface areas above about 300 m$^2$/g with a significant fraction of the pores having diameters greater than 350 Å and a significant fraction of the pores having diameters less than 70 Å.

15 Claims, No Drawings

PROCESS FOR PRODUCING WIDE-PORE CATALYST SUPPORTS

FIELD OF THE INVENTION

This invention relates to a process for preparing porous alumina supports having high surface areas and a significant fraction of their pore volume in pores greater than 350 Å in diameter.

BACKGROUND OF THE INVENTION

In the catalytic processing of petroleum feed stocks, it is often desirable to alter the pore structure of the catalyst support in order to accommodate different types of feeds. For example, when processing feed stocks with no metals or with a low metals content, it may be technically and economically desirable to use narrow-pore catalyst supports. On the other hand, when processing feed stocks of high metals content, the metals tend to deposit rapidly on the catalyst surface and plug the pores of conventional hydrogen processing catalysts, resulting in a loss of catalytic activity for sulfur and nitrogen removal. In order to maintain hydrotreating activity, it is necessary that the catalyst be high in surface area. To facilitate the diffusion of large components into and out of the catalyst and to prevent surface deposits of coke and metals, large pore diameters are required. These criteria necessitate the use of wide-pore catalyst supports which have high surface areas and a significant fraction of large pores. The large pores allows enhanced diffusion of large molecules into the catalyst while the smaller pores, providing most of the surface area, allow for hydroprocessing of the feed. Carriers of this type can be used as hydrotreating catalyst supports, especially for residue/demetallization applications.

SUMMARY OF THE INVENTION

The present invention relates to a process for the preparation of wide-pore alumina supports having surface areas above about 300 m²/g with a significant fraction (at least about 20%) of the pore volume located in pores greater than about 350 Å in diameter and a significant fraction of pores (at least about 20%) less than about 70 Å in diameter, a nitrogen pore volume ranging from about 0.4 cc/g to about 1.0 cc/g, and a crush strength greater than about 10 lbs. These supports are prepared by a process which comprises (a) precipitating an acid aluminum salt in an aqueous solution with a basic aluminum compound in an aqueous solution, (b) adding a phosphorus-containing compound to the precipitate of step (a) and adjusting the pH to a range between about 9.0 and 11.0, (c) aging the precipitate of step (b) at a temperature ranging from about 20° C. to about 90° C. for at least 15 minutes, (d) washing the product of step (c), (e) drying the product of step (c) at a temperature in the range from about 50° C. to about 150° C., and (f) calcining the product of step (e) at a temperature ranging from about 300° C. to about 900° C.

It has been found that by adding phosphorus during the aging step, a suitable control over the pore size distribution of the support can be obtained.

DESCRIPTION OF THE PREFERRED EMBODIMENTS

In the process of the instant invention, an acidic aluminum species and a basic aluminum species are utilized in combination with a phosphorus-containing compound to produce a phosphated alumina hydrogel which upon calcination has a significant fraction of its pore volume in pores greater than 350 Å, a surface area greater than about 300 m²/g and a nitrogen pore volume of about 0.4 cc/g to about 1.0 cc/g.

Precipitation of the alumina hydrogels may be carried out sequentially, where an acid species is added to a basic species or the reverse where a basic species is added to an acid species, or concurrently, where there is simultaneous addition of the acidic species and the basic species. The sequential titration procedure results in a constantly changing pH, whereas the concurrent titration procedure can be utilized to create a well-defined and constant environment for the precipitation. The precipitation in the instant invention is preferably carried out by the concurrent titration procedure.

In the preferred embodiment, the hydrogen is prepared by the simultaneous addition of an aqueous alkali metal aluminate and an aqueous solution of an acidic aluminum salt to cause precipitation of the alumina gel. Aluminum sulfate, nitrate or chloride are suitable examples of acid aluminum salts with aluminum chloride being preferred.

The temperature of the pH of the precipitation are important variables in the preparation of the instant aluminas needed to produce desirable physical qualities and an acceptable pore size distribution. As used herein, the precipitation pH refers to the constant pH maintained during concurrent titration or the final pH obtained when using the sequential titration method. Changes in precipitation temperatures and pHs result in changes in porosities. Depending upon the results desired, one skilled in the art can determine the required precipitation temperature and pH within the after-described limitations with minimal experimentation. In the instant invention, a precipitation temperature typically ranges from about 20° C. to about 90° C., and preferably from about 50° C. to about 85° C., and a precipitation pH between about 5.5 and about 10.0, preferably between about 5.5 and about 8.0, and more preferably between about 6.0 and about 7.5. The length of time required for the precipitation step is not critical. However, the maximum rate of addition of the acid aluminum species and the basic aluminum species is fixed by the efficiency with which the two streams can be mixed and the pH and temperature of the system effectively controlled.

After the precipitation step is completed, a phosphorus-containing compound is added to the slurry and dissolved therein. The pH of the slurry is then adjusted by the addition of ammonium hydroxide to fall in the range between about 9.0 and about 11.0, preferably about 9.5 to about 10.5, and aged at a temperature in the range between about 20° C. and about 90° C., preferably about 50° C. to about 85° C. for at least 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature. The aging pH, however, is critical. Products with acceptable pore size distributions are prepared only when the aging pH is between about 9.0 and about 11.0, and preferably between about 9.5 and about 10.5. Compounds prepared at lower pH values contain primarily macropores. The products formed containing primarily macropores have unacceptably low crush strengths. Aging at excessively high pHs will result in materials having excessively high salt contents as well as materials having the phosphorus displaced by $OH^-$.

The phosphorus-containing compounds which can be added to the precipitated hydrogel are for example, but not limited to, phosphoric acid, ammonium phosphate, ammonium hydrogen phosphate and mixtures thereof. The source of the phosphorus is not critical. It is often convenient, however, to adjust the pH of the phosphorus-containing solution to a pH near the aging pH with an acid or a base, depending on the pH of the solution. In a preferred embodiment, the phosphorus-containing compound is typically prepared using commercially available 85% phosphoric acid or ammonium phosphate although other material may be utilized. The amount of phosphorus-containing compound added to the precipitated hydrogel is such that the amount of phosphorus present in the final calcined alumina support is from about 0.1% to about 5.0% by weight, preferably from about 0.5% to about 4.5% and most preferably from about 1% to about 4%. The presence of greater amounts of phosphorus in the final calcined product results in unacceptably low densities and crush strengths.

After aging, the slurry is washed and filtered in routine fashion to remove substantially all of the salts formed during the precipitation of the hydrogel. The preferred solvent for washing is water although other solvents such as lower alkanols may be utilized.

After filtering, the material may be dried, mulled with addition of water, extruded or pelleted and calcined, or alternatively, partially dried, extruded or pelleted, dried more completely and calcined. Drying is accomplished by conventional means. It may be carried out by forced draft drying, vacuum drying, air drying or similar means. Drying temperatures are not critical and depend upon the particular means. Drying temperatures will typically range from about 50° C. to about 150° C.

Normally, the material is extruded after drying to the proper loss on ignition (LOI). However, to facilitate extrusion, organic binders and/or lubricants may be added prior to extrusion.

After drying, the material is calcined to cause conversion to γ-alumina. The material may be calcined in any atmosphere, reducing, oxidizing or neutral, although air is preferred. However, if binders and/or lubricants are used, the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. More frequently, the calcining and burn-out steps are combined using an oxygen-containing atmosphere.

Certain other processing steps may be incorporated into the above described procedure without deviating from the scope and intent of this invention. For example, prior to the complete drying of the hydrogel, it may be extruded and then dried more completely, followed by calcination.

The porous aluminas of the instant invention can be used as catalyst supports or as catalysts per se. As catalysts, the porous aluminas are useful in reactions which can be typically catalyzed by aluminas. For example, aluminas are particularly useful in hydrocracking and isomerization reactions.

The porous aluminas of the instant invention are particularly useful when utilized as supports for catalytically active Group VIB (i.e., Cr,Mo,W) and Group VIII metals. These catalyzed materials can be suitably applied in hydrogen conversion processes such as, for example, hydrotreating and demetallization.

The process for preparing wide-pore catalyst supports will be further described below by the following examples which are intended for illustration and are not to be construed as limiting the invention.

EXAMPLE 1

Five hundred and forty-four grams of reagent grade sodium aluminate was added to 1,000 grams of water which was then heated to 60° C. in order to effect solution of the materials. Seven hundred and forty grams of aluminum chloride hexahydrate were added to 760 grams of water and heated to 60° C. Both solutions were cooled to slightly less than 60° C. and placed in dropping funnels.

Five liters of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7 until the supply of sodium aluminate was exhausted. One fourth of the resulting slurry was then treated with 31.96 grams of ammonium phosphate salt ($(NH_4)_2HPO_4$). The pH of the slurry was then adjusted to 10.0 with ammonium hydroxide. The solution was aged for one hour at 60° C. The resulting material was filtered and washed in a large Buchner funnel with about 28 liters of water. The excess water from the wet filter cake was removed by vacuum. The hydrogel was then extruded using a small, hand-held extruder, dried overnight at 120° C. and calcined in air at 565° C. The properties of the support are listed in Table I.

COMPARATIVE EXAMPLE A

The preparative technique of Example I was repeated, except that the material was aged at a pH of 8 utilizing a solution of ammonium phosphate, phosphoric acid and ammonium hydroxide in ratios sufficient to yield a pH of 8. Results of the experiment are listed in Table I.

COMPARATIVE EXPERIMENT B

A support was prepared utilizing the technique of Example I, except that no phosphorus-containing compound was added. The results are listed in Table I.

TABLE I

| | Carrier Properties | | |
|---|---|---|---|
| | Example 1 | Comparative Experiment A | Comparative Experiment B |
| Aging pH[a] | 10.0 | 8.0 | 10.0 |
| Density g/cc[b] | .54 | 0.17 | 0.79 |
| Percent Shrinkage[c] | 51 | 31 | 56 |

TABLE I-continued

| | Carrier Properties | | |
|---|---|---|---|
| | Example 1 | Comparative Experiment A | Comparative Experiment B |
| $N_2$ Surface Area $m^2/g^d$ | 346 | 427 | 251 |
| $N_2$ Pore Volume $cc/g^e$ | 0.61 | 1.32 | 0.45 |
| Flat Plate Crush strength lbs.$^f$ | 14.0 | 4.0 | 22.0 |
| % wt. Phosphorus$^g$ | 4.0 | 5.5 | 0.00 |
| Hg Pore$^h$ Size Dist | | | |
| 50 ang | 42.9 | 0.8 | 30.1 |
| 50–70 ang | 20.4 | 7.8 | 64.0 |
| 70–100 ang | 4.0 | 11.0 | 1.9 |
| 100–150 ang | 2.7 | 6.5 | 1.7 |
| 150–350 ang | 4.6 | 8.4 | 1.6 |
| 350 ang | 25.5 | 65.6 | 0.9 |
| Ave Pore Diameter | 53.1 | 1,065.0 | 52.1 |

$^a$Measured using an Orion 231 pH meter and Orion electrodes.
$^b$209 cc of extrudate fully settled in a graduated cup and weighed.
$^c$Defined as $1 - \frac{\text{extrudate size after calcining}}{\text{die size of extruder}}$ expressed as percent.
$^d$BET, by nitrogen adsorption/desorption, Micromeritics Digisorb 2500 Instrument.
$^e$By nitrogen adsorption, Micromeritics Digisorb 2500 Instrument.
$^f$Flat plate, single pellet, extrudate approximately 5 mm in length.
$^g$Weight percent determined by neutron activation analysis.
$^h$Determined by mercury intrusion, to 60,000 psi using a Micromeritics Autopore 9200, using a 130° contact angle and 0.473 N/m surface tension of mercury. Numbers listed are percent pore volume except the average pore diameter which is in angstroms.

I claim:

1. A process for the preparation of wide-pore alumina supports having surface areas above about 300 $m^2/g$, at least about 20% of the pore volume located in pores greater than about 350 Å and at least about 20% of pores less than about 70 Å in diameter, a crush strength greater than about 10 lbs. and containing an amount of phosphorus in the range from about 0.1% to about 5.0% by weight, which process comprises:
    (a) concurrently titrating an acid aluminum salt in an aqueous solution with a basic aluminum compound in an aqueous solution, thereby forming a precipitate,
    (b) adding a phosphorus-containing compound to the precipitate and adjusting the pH to a range between about 9.0 and about 11.0,
    (c) aging the precipitate at the adjusted pH at a temperature in the range between about 20° C. and about 90° C. for at least 15 minutes,
    (d) washing the precipitate,
    (e) drying the precipitate, and
    (f) calcining the precipitate at a temperature ranging from about 300° C. to about 900° C.

2. The process of claim 1 wherein the amount of phosphorus in the final calcined support is in the range from about 1% to about 4% by weight.

3. The process of claim 1 wherein the precipitation is carried out at a pH in the range between about 5.5 to about 10.0.

4. The process of claim 3 wherein the precipitation is carried out at a pH in the range between about 5.5 and about 8.0.

5. The process of claim 1 wherein the precipitation is carried out at a temperature between about 20° C. and about 90° C.

6. The process of claim 5 wherein the precipitation is carried out at a temperature between about 50° C. and about 85° C.

7. The process of claim 1 wherein step (a) is carried out by concurrent titration.

8. The process of claim 1 wherein step (a) is carried out by sequential titration.

9. The process of claim 1 wherein the acid salt is selected from the group consisting of aluminum sulfate, nitrate or chloride, and the basic compound is an alkali metal aluminate.

10. The process of claim 1 wherein the phosphorus-containing compound is selected from the group consisting of phosphoric acid, ammonium phosphate and mixtures thereof.

11. The process of claim 1 wherein the aging pH is in the range between about 9.5 and about 10.5.

12. The process of claim 1 wherein drying and calcining may be carried out in the same step.

13. A process for the preparation of wide-pore alumina supports having surface areas above about 300 $m^2/g$, at least about 20% of the pore volume located in pores greater than about 350 Å and at least about 20% of pores less than about 70 Å, a crush strength greater than about 10 lbs. and containing an amount of phosphorus in the range from about 0.1% to about 5.0% by weight, which process comprises:
    (a) concurrently titrating an acid aluminum salt selected from the group consisting of aluminum sulfate, nitrate or chloride in an aqueous solution with an alkali metal aluminate in an aqueous solution, thereby forming a precipitate,
    (b) adding a phosphorus-containing compound selected from the group consisting of phosphoric acid, ammonium phosphate and mixtures thereof to the precipitate and adjusting the pH to a range between about 9.5 and about 10.5,
    (c) aging the precipitate at the adjusted pH at a temperature in the range between about 50° C. and about 85° C. for at least 15 minutes,
    (d) washing the precipitate,
    (e) drying the precipitate, and
    (f) calcining the precipitate at a temperature ranging from about 300° C. to about 900° C.

14. The process of claim 13 wherein step (a) is carried out at a pH in the range between about 5.5 and about 8.0.

15. The process of claim 13 wherein step (a) is carried out at a temperature between about 50° C. and about 85° C.

* * * * *